(12) United States Patent
Chen et al.

(10) Patent No.: US 10,322,302 B2
(45) Date of Patent: Jun. 18, 2019

(54) INTELLIGENT DISASTER PREVENTION AND ESCAPE METHOD AND SYSTEM

(71) Applicants: Shuo hong Chen, Taipei (TW); Xiao mei Lin, Taipei (TW)

(72) Inventors: Shuo hong Chen, Taipei (TW); Xiao mei Lin, Taipei (TW); Zhi ying Wu, Taipei (TW)

(*) Notice: Subject to any disclaimer, the term of this patent is extended or adjusted under 35 U.S.C. 154(b) by 137 days.

(21) Appl. No.: 15/509,862

(22) PCT Filed: Sep. 9, 2014

(86) PCT No.: PCT/CN2014/086099
§ 371 (c)(1),
(2) Date: Mar. 9, 2017

(87) PCT Pub. No.: WO2016/037308
PCT Pub. Date: Mar. 17, 2016

(65) Prior Publication Data
US 2017/0304659 A1 Oct. 26, 2017

(51) Int. Cl.
*A62B 3/00* (2006.01)
*G01C 21/20* (2006.01)

(52) U.S. Cl.
CPC .............. *A62B 3/00* (2013.01); *G01C 21/206* (2013.01)

(58) Field of Classification Search
CPC ....... A62B 3/00; G01C 21/206; H04W 4/025; H04W 4/023; G06F 17/3087; G06F 17/30241; G06F 17/30876
USPC ...... 701/423; 340/539.13, 539.18, 990, 993; 455/404.1, 456.1, 456.3, 457, 466; 370/328, 338
See application file for complete search history.

(56) References Cited

U.S. PATENT DOCUMENTS

| | | | | |
|---|---|---|---|---|
| 5,543,789 A | * | 8/1996 | Behr | G01C 21/26 340/990 |
| 5,867,110 A | * | 2/1999 | Naito | G08G 1/205 340/286.05 |
| 7,924,149 B2 | | 4/2011 | Mendelson | |
| 2010/0057354 A1 | | 3/2010 | Chen et al. | |

FOREIGN PATENT DOCUMENTS

| | | | |
|---|---|---|---|
| CN | 101315725 A | * | 12/2008 |
| CN | 102324064 A | | 1/2012 |
| JP | H0749986 | | 2/1995 |
| TW | 201421430 | | 6/2014 |
| WO | WO2013056395 | | 4/2013 |

* cited by examiner

*Primary Examiner* — Dalena Tran

(57) ABSTRACT

An intelligent disaster prevention and escape method includes the steps of: sensing surrounding environment information of plural nodes of a region of a building to generate plural sensing signals of the nodes respectively; calculating a risk coefficient of each node according to the sensing signals; calculating a threat coefficient for plural paths according to the risk coefficients and the distances between the adjacent nodes, for executing an escape path planning algorithm to produce a safest path plan; and producing plural escape instructions for the nodes respectively according to the safest path plan. The invention has the effect of producing the safest path plan according to the risk coefficient and the distance between adjacent nodes, so as to provide safe and immediate escape instructions to guide people to escape and evacuate and reduce casualties.

6 Claims, 7 Drawing Sheets

| Step | N1 | N2 | N3 | N4 | N5 | N6 | Will add | Front cut point update |
|---|---|---|---|---|---|---|---|---|
| EXIT N1 Starting | | | | | | | | |
| a1 | 125000 | ? | | | | | N1 | N1->N1 |
| a2 | 125000 | 125000 | ? | | | | N2 | N1->N1, N2->N1 |
| a3 | 125000 | 125000 | 140625 | ? | | | N3 | N1->N1, N2->N1, N3->N2 |
| a4 | 125000 | 125000 | 140625 | 250000 | ? | | N4 | N1->N1, N2->N1, N3->N2, N4->N2 |
| a5 | 125000 | 125000 | 140625 | 250000 | 250000 | ? | N5 | N1->N1, N2->N1, N3->N2, N4->N2, N5->N4 |
| a6 | 125000 | 125000 | 140625 | 250000 | 250000 | ? | | N1->N1, N2->N1, N3->N2, N4->N2, N5->N4 |
| EXIT N3 Starting | | | | | | | | |
| c1 | 125000 | 125000 | 15625 | 250000 | 250000 | ? | N3 | N1->N1, N2->N1, N3->N3, N4->N2, N5->N4 |
| c2 | 125000 | 15625 | 15625 | 250000 | 250000 | ? | N2 | N1->N1, N2->N3, N3->N3, N4->N2, N5->N4 |
| c3 | 125000 | 15625 | 15625 | 140625 | 250000 | ? | N1 | N1->N1, N2->N3, N3->N3, N4->N3, N5->N4 |
| c4 | 125000 | 15625 | 15625 | 140625 | 250000 | ? | N4 | N1->N1, N2->N3, N3->N3, N4->N3, N5->N4 |
| c5 | 125000 | 15625 | 15625 | 140625 | 140625 | ? | N5 | N1->N1, N2->N3, N3->N3, N4->N3, N5->N4 |
| c6 | 125000 | 15625 | 15625 | 140625 | 140625 | ? | | N1->N1, N2->N3, N3->N3, N4->N3, N5->N4 |

FIG. 3

| Step | N1 | N2 | N3 | N4 | N5 | N6 | Will add | Front cut point update |
|---|---|---|---|---|---|---|---|---|
| EXIT N1 Starting | | | | | | | | |
| a1 | 125000 | ? | ? | ? | ? | ? | N1 | N1->N1 |
| a2 | 125000 | 125000 | ? | ? | ? | ? | N2 | N1->N1, N2->N1 |
| a3 | 125000 | 125000 | 140625 | ? | ? | ? | N3 | N1->N1, N2->N1, N3->N2, N4->N2 |
| a4 | 125000 | 125000 | 140625 | 250000 | ? | ? | N4 | N1->N1, N2->N1, N3->N2, N4->N2 |
| a5 | 125000 | 125000 | 140625 | 250000 | 250000 | ? | N5 | N1->N1, N2->N1, N3->N2, N4->N2, N5->N4 |
| a6 | 125000 | 125000 | 140625 | 250000 | 250000 | ? | | N1->N1, N2->N1, N3->N2, N4->N2, N5->N4 |
| EXIT N3 Starting | | | | | | | | |
| c1 | 125000 | 125000 | 15625 | 250000 | 250000 | ? | N3 | N1->N1, N2->N1, N3->N3, N4->N2, N5->N4 |
| c2 | 125000 | 15625 | 15625 | 250000 | 250000 | ? | N2 | N1->N1, N2->N3, N3->N3, N4->N2, N5->N4 |
| c3 | 125000 | 15625 | 15625 | 140625 | 250000 | ? | N1 | N1->N1, N2->N3, N3->N3, N4->N2, N5->N4 |
| c4 | 125000 | 15625 | 15625 | 140625 | 250000 | ? | N4 | N1->N1, N2->N3, N3->N3, N4->N2, N5->N4 |
| c5 | 125000 | 15625 | 15625 | 140625 | 140625 | ? | N5 | N1->N1, N2->N3, N3->N3, N4->N2, N5->N4 |
| c6 | 125000 | 15625 | 15625 | 140625 | 140625 | ? | | N1->N1, N2->N3, N3->N3, N4->N2, N5->N4 |
| Far EXIT N6 Starting | | | | | | | | |
| f1 | 125000 | 15625 | 15625 | 140625 | 140625 | 15625 | N6 | N1->N1, N2->N3, N3->N3, N4->N2, N5->N4, N6->N6 |
| f2 | 125000 | 15625 | 15625 | 140625 | 31250 | 15625 | N5 | N1->N1, N2->N3, N3->N3, N4->N2, N5->N6, N6->N6 |
| f3 | 125000 | 15625 | 15625 | 140625 | 31250 | 15625 | N4 | N1->N1, N2->N3, N3->N3, N4->N2, N5->N6, N6->N6 |
| f4 | 125000 | 15625 | 15625 | 140625 | 31250 | 15625 | N2 | N1->N1, N2->N3, N3->N3, N4->N2, N5->N6, N6->N6 |
| f5 | 125000 | 15625 | 15625 | 140625 | 31250 | 15625 | N3 | N1->N1, N2->N3, N3->N3, N4->N2, N5->N6, N6->N6 |
| f6 | 125000 | 15625 | 15625 | 140625 | 31250 | 15625 | N1 | N1->N1, N2->N3, N3->N3, N4->N2, N5->N6, N6->N6 |
| f7 | 125000 | 15625 | 15625 | 140625 | 31250 | 15625 | N1 | N1->N1, N2->N3, N3->N3, N4->N2, N5->N6, N6->N6 |

FIG. 5

INTELLIGENT DISASTER PREVENTION AND ESCAPE METHOD AND SYSTEM

BACKGROUND OF INVENTION

Field of the Invention

The present invention relates to an intelligent disaster prevention and escape method, in particular to the intelligent disaster prevention and escape method and system capable of producing a safest path plan according to a risk coefficient and the distance between adjacent nodes, to provide immediate escape instructions.

Description of the Related Art

With the development and urbanization of cities, today's buildings become increasingly taller, bigger and more complicated, and the casualties caused by a disaster occurred in the buildings must be severe, and thus the fire issue of the buildings also catches increasingly more attention. At present, the public facilities in a building generally include emergency escape exits and escape instruction signs to guide trapped people to escape through an escape path while the event of a disaster happened. However, the traditional escape instruction signs simply direct people to the exit of the current floor without considering any immediate burst situation or whether the path directed by the traditional escape instruction sign is reliable or safe.

In other words, the traditional escape instruction sign does not guarantee to provide a safer or more reliable escape path for the people at that floor to evacuate and escape, and fails to timely select the safest and most effective path.

Therefore, it is one of the important subjects of this field to provide the most reliable and safest escape path instruction, so as to reduce casualties in a fire.

SUMMARY OF THE INVENTION

Therefore, the primary objective of the present invention is to overcome the drawbacks of the prior art by providing an intelligent disaster prevention and escape method and system capable of producing a safest path plan according to a risk coefficient and the distance between adjacent nodes to guide people to escape and evacuate.

To achieve the aforementioned objective, the present invention provides an intelligent disaster prevention and escape method comprising the steps of:

sensing surrounding environment information of a plurality of nodes of a region of a building to generate a plurality of sensing signals of the plurality of nodes respectively;

calculating a risk coefficient of each node according to the plurality of sensing signals;

calculating a threat coefficient for a plurality of paths according to the plurality of risk coefficients and the distances between the plurality of adjacent nodes, for executing an escape path planning algorithm to produce a safest path plan; and producing a plurality of escape instructions for the plurality of nodes respectively according to the safest path plan.

In the intelligent disaster prevention and escape method, the escape path planning algorithm executes the steps of: using a first node of the plurality of nodes as a calculation starting point, and selecting and adding a specific second node having the minimum threat coefficient from a plurality of second nodes connected to the first node and not selected yet; adding a third node of the region, and updating the third node to a threat coefficient of the first node or the second node, and updating record of the minimum threat coefficient of the path of the third node when the minimum threat coefficient is calculated; and repeatedly adding a new node, and calculating the new node to a minimum threat coefficient of any precursor node until all nodes of the region have been selected and added.

In a preferred embodiment, the escape path planning algorithm is provided for using each exit node of the plurality of nodes as the calculation starting point to form the safest path plan, wherein an escape direction is the direction of a node of the plurality of nodes reaching the precursor node of the minimum threat coefficient.

In the intelligent disaster prevention and escape method, the threat coefficient of the plurality of paths is calculated according to the risk coefficient and the distance between a plurality of adjacent nodes to perform the escape path planning algorithm and the safest path plan further comprises the step of adding an exit node of a second region to the region to calculate the safest path plan.

In the intelligent disaster prevention and escape method, the step of calculating the risk coefficient of the plurality of nodes according to the plurality of sensing signals is further used for performing a regular operation of the plurality of sensing signals.

The present invention further provides an intelligent disaster prevention and escape system comprising a plurality of sensors, installed to the nodes of a region of a building, for sensing surrounding environment information of the plurality of nodes to produce the plurality of sensing signals of plurality of nodes respectively; a plurality of escape direction instructing devices, installed at the plurality of nodes of the region of the building according to a safest path plan to generate a plurality of escape instructions of the plurality of nodes respectively; and a processing unit, coupled to the plurality of sensors and the plurality of escape direction instructing devices, for calculating a plurality of risk coefficients of the plurality of nodes according to the plurality of sensing signals; and calculating a threat coefficient of the plurality of paths according to the plurality of risk coefficients and the distances between the plurality of adjacent nodes for executing an escape path planning algorithm and producing the safest path plan.

In the intelligent disaster prevention and escape system, the escape path planning algorithm executes the steps of: using a first node of the plurality of nodes as a calculation starting point, and selecting and adding a specific node having the minimum threat coefficient from a plurality of second nodes connected to the first node and not selected yet; adding a third node of the region, and updating the third node to a threat coefficient of the first node or the second node, and updating record of the minimum threat coefficient of the path of the third node when the minimum threat coefficient is calculated; and repeatedly adding a new node, and calculating the new node to a minimum threat coefficient of any precursor node until all nodes of the region have been selected and added.

In the intelligent disaster prevention and escape system, the threat coefficient is the product of the risk coefficient and the distance.

In the intelligent disaster prevention and escape system, the processing unit is provided for adding an exit node of a second region to the region to calculate the safest path plan.

In summation, the present invention provides an intelligent disaster prevention and escape method and an intelligent disaster prevention and escape system capable of producing the safest path plan according to the risk coefficient and the distance between adjacent nodes to produce safe, reliable and immediate escape instructions to guide people to escape and evacuate, so as to reduce casualties occurred in the disaster.

The above and other objects, features and advantages of the present invention will become apparent from the following detailed description taken with the accompanying drawings. It is noteworthy that the components as shown in the drawings are schematic drawings not necessarily drawn according to the actual proportion.

BRIEF DESCRIPTION OF THE DRAWINGS

FIG. 3 is a schematic view of calculating an escape path planning algorithm in accordance with a preferred embodiment of the present invention;

FIG. 5 is a schematic view of adding an exit node of a second region to the first region to calculate the escape path planning algorithm in accordance with a preferred embodiment of the present invention;

DESCRIPTION OF THE INVENTION

In this specification and the claims recited below, technical terms are used to indicate respective components, and people having ordinary skills in the art should understand that hardware manufacturers may use different terms for the same component. Therefore, the difference between terms in this specification and the claims of this specification should be used to differentiate the components, but the difference between the functions of the components should be used to differentiate the components. The term "comprising" used in the specification and claims is an open term which should be interpreted as "including but not limited to". In addition, the term "coupled to" includes any direct or indirect electrical connection means. Therefore, if a first device is coupled to a second device as described in the specification, it means that the first device may be directly electrically coupled to the second device, or indirectly electrically coupled to the second device through another device or connection means.

Figure 1:
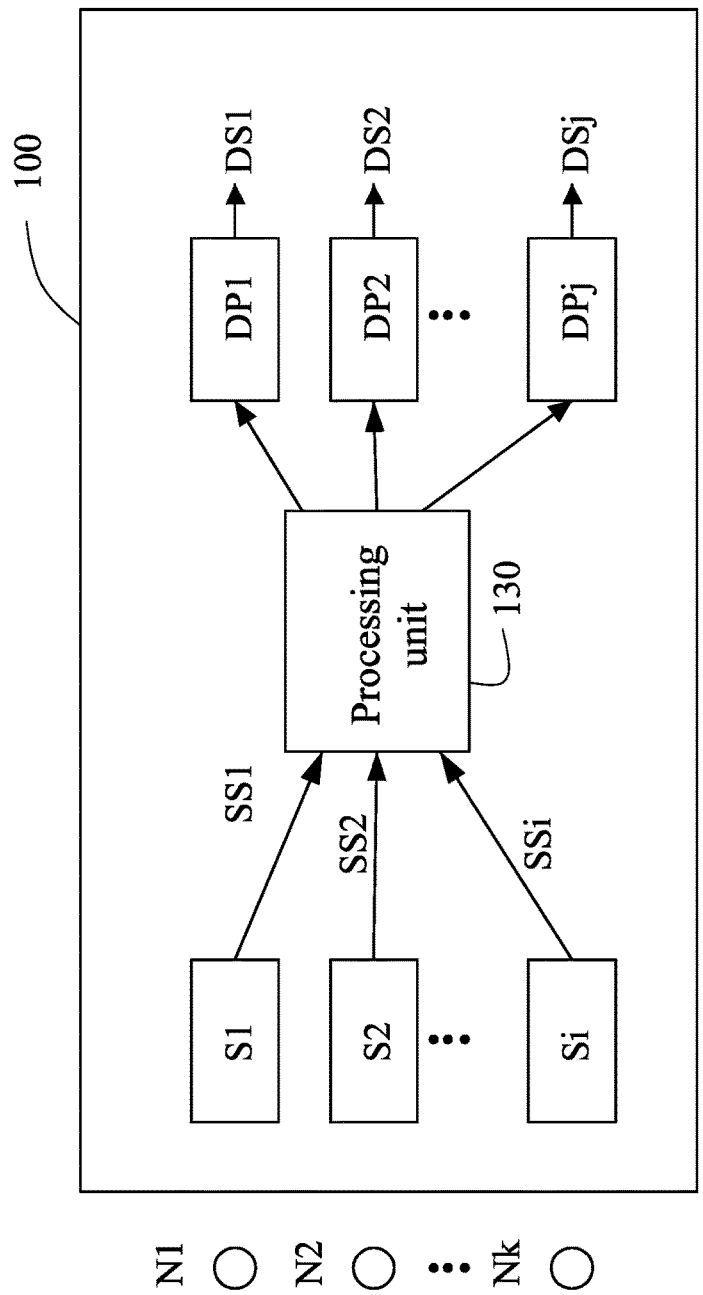
FIG. 1 is a schematic view of an intelligent disaster prevention and escape system in accordance with a preferred embodiment of the present invention.

With reference to FIG. 1 for a schematic view of an intelligent disaster prevention and escape system 100 in accordance with a preferred embodiment of the present invention, the intelligent disaster prevention and escape system 100 comprises (or includes but not limited to): a plurality of sensors (such as i sensors) $S_1 \sim S_i$, a plurality of escape direction instructing devices (such as j escape direction instructing devices) $DP_1 \sim DP_j$ and a processing unit 130. It is noteworthy that the sensors $S_1 \sim S_i$ are installed at a plurality of nodes of a region of a building for sensing surrounding environment information of the plurality of nodes (such as k nodes) $N_1 \sim N_k$ for producing a plurality of sensing signals $SS_1 \sim SS_i$ to produce the plurality of nodes $N_1 \sim N_k$ respectively. For example, the sensors $S_1 \sim S_i$ are provided for sensing ambient temperature, smoke, flame, carbon monoxide concentration, carbon dioxide concentration or any other dangerous gas concentration and generating the plurality of sensing signals $SS_1 \sim SS_i$ respectively. However, this example is used for illustrating the present invention, but not intended for limiting the scope of the invention. The escape direction instructing devices $DP_1 \sim DP_j$ are installed at the plurality of nodes $N_1 \sim N_k$ of the region of the building for generating a plurality of escape instructions $DS_1 \sim DS_j$ of the plurality of nodes $N_1 \sim N_k$ respectively according to the safest path plan. In addition, the processing unit 130 is coupled to the plurality of sensors $S_1 \sim S_i$ and the plurality of escape direction instructing devices $DP_1 \sim DP_j$ for calculating a plurality of risk coefficients $RC_1 \sim RC_k$ of the plurality of nodes $N_1 \sim N_k$ according to the plurality of sensing signals $SS_1 \sim SS_i$ respectively. It is noteworthy that the processing unit 130 receives the plurality of sensing signals $SS_1 \sim SS_i$ sensed by the plurality of sensors $S_1 \sim S_i$ via a wireless or cable connection. However, this is just one of the embodiments illustrating the present invention but not a limitation of the present invention. The processing unit 130 executes an escape path planning algorithm to produce the safest path plan according to the plurality of risk coefficients $RC_1 \sim RC_k$ and a distance $D_1 \sim D_h$ between the plurality of adjacent nodes. For example, when the processing unit 130 calculates the safest path plan, the distances $D_1 \sim D_h$ between the plurality of adjacent nodes are used as the weights of the plurality of risk coefficients $RC_1 \sim RC_k$ to produce the minimum threat coefficient. In a preferred embodiment of the present invention, the processing unit 130 may be a server or a computer, but the invention is not limited to such arrangement only. In addition, the plurality of adjacent nodes with the distances $D_1 \sim D_h$ apart may be built in the server or the computer, but the invention is not just limited to such arrangement only.

It is noteworthy that the numbers i, j, k, and h are used as examples for the illustrating the invention, but these numbers may the equal or unequal and are not intended for limiting the present invention.

Figure 2:
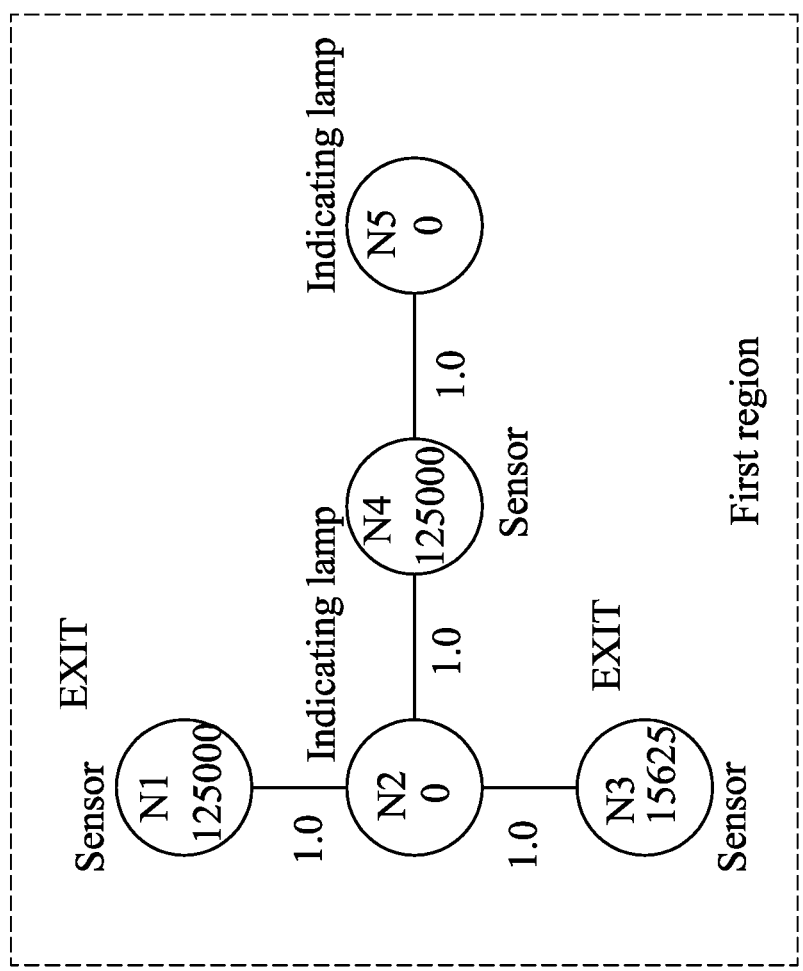
FIG. 2 is a schematic view of an intelligent disaster prevention and escape system in accordance with a preferred embodiment of the present invention.

A related operation of the escape path planning algorithm in accordance with the present invention is described below. With reference to FIG. 2 for a schematic view of a plurality of nodes of a first region of a building in accordance with a preferred embodiment of the present invention, the first region includes 5 nodes $N_1 \sim N_5$, wherein the nodes $N_1$ and $N_3$ are exit nodes, and all of the 5 nodes $N_1 \sim N_5$ have a plurality of sensors $S_1 \sim S_5$ installed thereon, and the plurality of sensors of each node may be used for sensing ambient temperature, smoke, flame, carbon monoxide, carbon dioxide or infrared light, etc to generate a plurality of sensing signals $SS_1 \sim SS_i$ respectively. For example, the higher temperature, the more dangerous. The more concentrated smoke, the more dangerous. The higher concentration of carbon monoxide or carbon dioxide, or the greater the wavelength (exceeding 1.0 µm) detected by an infrared flame sensor, the more dangerous. Therefore, the processing unit 130 is capable of calculating the risk coefficient $RC_1 \sim RC_5$ of each node $N_1 \sim N_5$ according to the sensing signal $SS_1 \sim SS_5$ of each node. It is noteworthy that the processing unit 130 of a preferred embodiment of the present invention may detect the temperature, smoke concentration, carbon monoxide concentration, carbon dioxide concentration in the sensing signals $SS_1 \sim SS_5$ and detect the wavelength by the infrared flame sensor before performing the regular planning operation, and then the invention further calculates the risk coefficients $RC_1 \sim RC_5$.

With reference to FIG. 2 for a preferred embodiment of the present invention, all of the distances D between adjacent nodes are set to 1 to facilitate the calculation, and the minimum threat coefficient of each node is the numerical value of the risk coefficient (with a weight equal to 1), but the present invention is not just limited to such arrangement only. Assumed that the ignition point is situated at the intersection of the node $N_1$ and the node $N_4$, so that the plurality of sensors $S_1$ and $S_4$ installed on the nodes $N_1$ and $N_4$ detect abnormal situations, and the processing unit 130 calculates the risk coefficient $RC_1 \sim RC_5$ of the nodes $N_1 \sim N_5$ which are equal to 25000 for the node $N_1$, 0 for the node $N_2$, 15625 for the node $N_3$, 125000 for the node $N_4$ and 0 for the node $N_5$.

With reference to FIGS. 2 and 3, FIG. 3 is a schematic view of an escape path planning algorithm in accordance with the present invention, the escape path planning algorithm comprises the following steps:

In Step a1, the processing unit 130 uses a first node (which is the exit node $N_1$) in the plurality of nodes as a calculation starting point, the minimum threat coefficient of the node $N_1$ to the node $N_1$ ($N_1 \rightarrow N_1$) is equal to 125000, and the precursor node is updated to be N1→N1.

In Step a2, a specific second node (node $N_2$) having a minimum threat coefficient and connected to the first node (node N1) is selected from the plurality of second nodes (nodes $N_2$, $N_3$, $N_4$, and $N_5$) and added. Now, the minimum threat coefficient from the node $N_1$ to the node $N_1$ ($N_1 \rightarrow N_1$) is equal to 125000, and the minimum threat coefficient from the node $N_2$ to the node $N_1$($N_2 \rightarrow N_1$) is equal to 125000, and the precursor node is updated to be $N_1 \rightarrow N_1$ and $N_2 \rightarrow N$.

In Step a3, a third node (node $N_3$) of the region is added to update the minimum threat coefficient reaching the first node (node $N_1$) and the second node (node $N_2$). Now, the minimum threat coefficient of the node $N_3$ to the node $N_1$($N_3 \rightarrow N_1$) is equal to 125000+0*1+15625*1=140625 and the precursor nodes are updated to $N_1 \rightarrow N_1$, $N_2 \rightarrow N_1$ and $N_3 \rightarrow N_2$, and then a new node (node $N_4$, $N_5$) is added repeatedly until all nodes of the region are added (Steps a4 and a5).

For example, a new node $N_4$ is added in Step a4. Now, the minimum threat coefficient from the node $N_4$ to the node $N_1$($N_4 \rightarrow N1$) is equal to 125000+0*1+125000*1=250000 and the precursor nodes are updated to $N_1 \rightarrow N_1$, $N_2 \rightarrow N_1$, $N_3 \rightarrow N_2$ and $N_4 \rightarrow N_2$.

In Step a5, a new node $N_5$ is added. Now, the minimum threat coefficient from the node $N_5$ to the node $N_1$($N_5 \rightarrow N_1$) is equal to 125000+0*1+125000*1+0*1=250000 and the precursor nodes are updated to $N_1 \rightarrow N_1$, $N_2 \rightarrow N_1$, $N_3 \rightarrow N_2$, $N_4 \rightarrow N_2$ and $N_5 \rightarrow N_4$.

Finally, confirmation is made in Step a6, and the minimum threat coefficients from the nodes $N_1$, $N_2$, $N_3$, $N_4$ and N5 to the exit node $N_1$ are equal to 125000, 125000, 140625, 250000 and 250000 respectively.

In FIGS. 2 and 3, the escape path planning algorithm of this preferred embodiment is used for using each exit node (such as the exit node $N_3$) in the plurality of nodes sequentially as the calculation starting point to form the safest path plan. It is noteworthy that when the processing unit 130 calculates the minimum threat coefficient, the record of the minimum threat coefficient is updated. For example, in Step c1, the node $N_3$ is used as a calculation starting point. Now, the minimum threat coefficient from the node $N_3$ to the node $N_3$($N_3 \rightarrow N_3$) is 15625 which is smaller than 140625 or the original minimum threat coefficient from the node $N_3$ to the node $N_1$($N_3 \rightarrow N_1$), so that the record of the minimum threat coefficient is updated to 15625, and the precursor nodes are updated to $N_1 \rightarrow N_1$, $N_2 \rightarrow N_1$, $N_3 \rightarrow N_3$, $N_4 \rightarrow N_2$ and $N_5 \rightarrow N_4$.

In Step c2, a minimum threat coefficient having a specific second node (node $N_2$) and connected to the first node (node $N_3$) and not selected from the plurality of second nodes (nodes $N_1$, $N_2$, $N_4$, and $N_5$) is selected and added. Now, the minimum threat coefficient from the node $N_3$ to the node $N_3$($N_3 \rightarrow N_3$) is equal to 15625, and minimum threat coefficient from the node $N_2$ to the node $N_3$($N_2 \rightarrow N_3$) is equal to 15625 which is smaller than 125000 or the original minimum threat coefficient from the node $N_2$ to the node $N_1$($N_2 \rightarrow N_1$), so that the record of the minimum threat coefficient is updated to 15625, and the precursor nodes are updated to $N_1 \rightarrow N_1$, $N_2 \rightarrow N_3$, $N_3 \rightarrow N_3$, $N_4 \rightarrow N_2$, $N_5 \rightarrow N_4$. Similarly, the principle of Steps c3~c6 is substantially the same as the aforementioned steps, and thus will not be repeated. In the confirmation conducted in the step c6, the minimum threat coefficients from the nodes $N_1$, $N_2$, $N_3$, $N_4$ and $N_5$ to the exit node $N_1$ are equal to 125000, 15626, 15625, 140625 and 140625 respectively. The steps a6 and c6 of FIG. 3 show that the minimum threat coefficient from the node $N_2$ to the exit node $N_3$ is equal to 15625, which is smaller than 125000 or the minimum threat coefficient from the node $N_2$ to the exit node $N_1$. Since the escape direction is the direction of a node of the plurality of nodes reaching a precursor node of the minimum threat coefficient, therefore when a person is situated at the node $N_2$, escaping in the direction towards the node $N_3$ is safer (than the direction from the node $N_2$ to the node $N_1$), and the processing unit 130 will control an indicating lamp $DP_2$ at the node $N_2$ to guide the person in a direction towards the exit node $N_3$.

Figure 4:
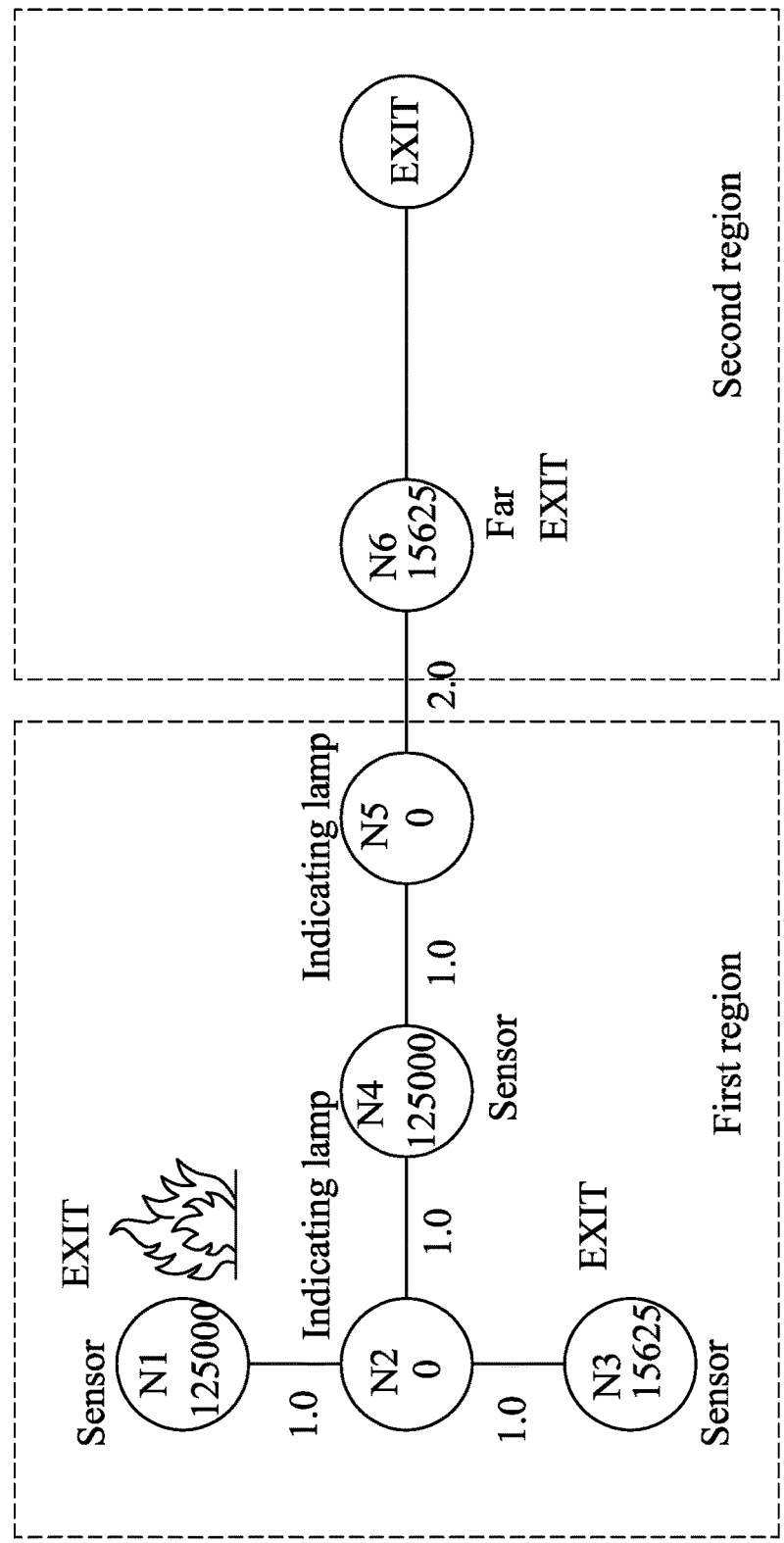
FIG. 4 is a schematic view of a plurality of nodes of a first region and a second region of a building in accordance with a preferred embodiment of the present invention.

With reference to FIG. 4 for a schematic view of a plurality of nodes $N_1 \sim N_6$ of a first region and a second region of a building in accordance with a preferred embodiment of the present invention, the distance between an exit node $N_6$ of the second region and the node $N_5$ of the first region is equal to 2, and the exit node $N_6$ is a far exit node. With reference to FIGS. 4 and 5, FIG. 5 shows a schematic view of adding an exit node of a second region to the first region to calculate the escape path planning algorithm in accordance with a preferred embodiment of the present invention, the processing unit 130 is used to add an exit node $N_6$ of a second region to the first region to calculate the safest path plan. In Steps $f_1 \sim f_7$, the exit node $N_3$ is used as the calculation starting point to form the safest path plan. Since the principle of the steps $f_1 \sim f_7$ is substantially the same as the aforementioned steps, it will not be repeated. It is noteworthy that the distance between an exit node $N_6$ of the second region and the node $N_5$ of the first region is equal to 2, so that when the node $N_5$ to the node $N_6$($N_5 \rightarrow N_6$) or the node $N_6$ to the node N5($N_6 \rightarrow N_5$) is calculated, the weight is equal to 2. For example, a node $N_5$ is added in the step $f_2$, the minimum threat coefficient from the node $N_5$ to the node $N_6$($N_5 \rightarrow N_6$) is equal to 15625*2+0=31250. Similarly, in the confirmation conducted in the step $f_7$, the minimum threat coefficients from the nodes $N_1$, $N_2$, $N_3$, $N_4$, $N_4$ and $N_6$ to the exit node $N_6$ are equal to 125000, 15626, 15625, 140625, 31250 and 15625 respectively. The steps a6, c6 and f7 of FIG. 3 show that the minimum threat coefficient from the node $N_5$ to the exit node $N_6$ is equal to 15625, which is smaller than 250000 (the minimum threat coefficient from the node $N_5$ to the exit node $N_1$ and 140625 (the minimum threat coefficient from the node $N_5$ to the exit node $N_3$). In other words, it is safer for a person at the node $N_5$ to escape in a direction from the second region to the far exit node $N_6$ (because this path has the minimum threat coefficient), and the processing unit 130 will control an indicating lamp $DP_5$ at the node $N_5$ to guide the person to escape to the far exit node $N_6$ of the second region.

In another preferred embodiment of the present invention, the escape path planning algorithm may set the known shortest distance between the plurality of nodes to infinite or a relative larger value and the distance between the calculation starting point and the calculation starting point to 0, but the present invention is not limited to such arrangement only.

Figure 6:
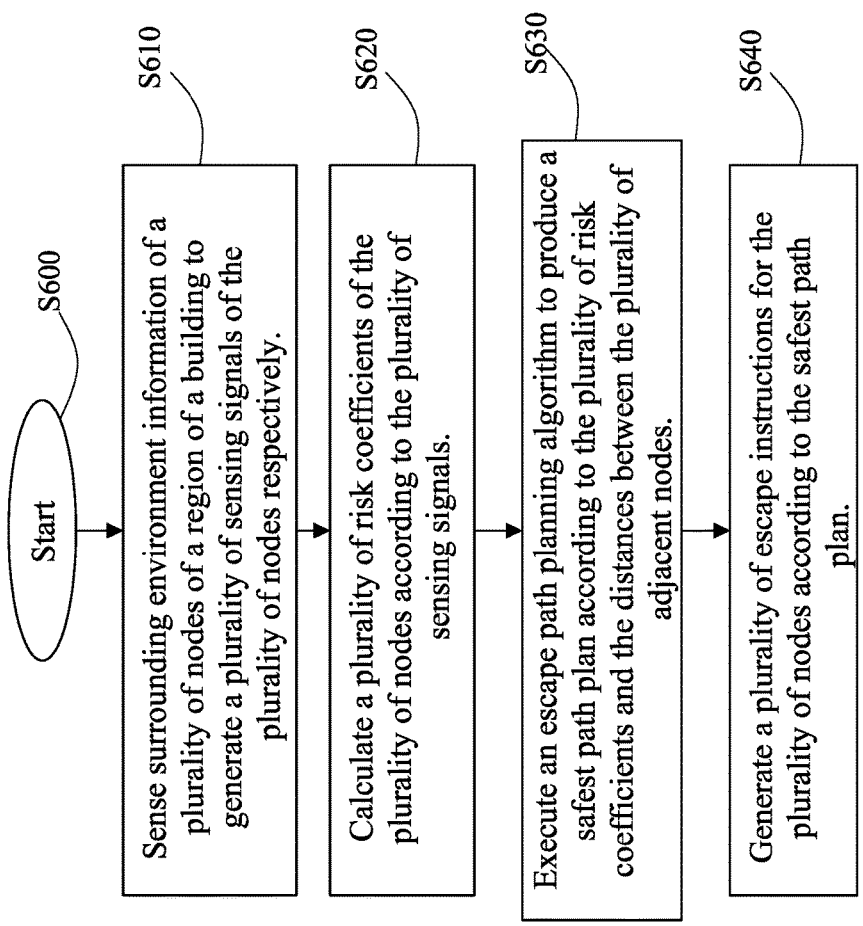
FIG. 6 is a flow chart of an operating example of an intelligent disaster prevention and escape method in accordance with the present invention.

With reference to FIG. 6 for a flow chart of an intelligent disaster prevention and escape method in accordance with a preferred embodiment of the present invention, the method comprises the following steps: (It is noteworthy that the method may be carried out without following the steps as shown in FIG. 6 to achieve the substantially same result):

Step S600: Start.

Step S610: Sense surrounding environment information of a plurality of nodes of a region of a building to generate a plurality of sensing signals of the plurality of nodes respectively.

In Step S620: Calculate a plurality of risk coefficients of the plurality of nodes according to the plurality of sensing signals.

In Step S630: Execute an escape path planning algorithm to produce a safest path plan according to the plurality of risk coefficients and the distances between the plurality of adjacent nodes.

In Step S640: Generate a plurality of escape instructions for the plurality of nodes according to the safest path plan.

The steps as shown in FIG. 6 and the components as shown in FIG. 1 show the operation of each component. For simplicity, the operation is not repeated. It is noteworthy that the step S610 is carried out by the plurality of sensors $S_1$~$S_i$; the steps S620 and S630 are executed by the processing unit 130; and the step S640 is executed by the plurality of escape direction instructing devices $DP_1$~$DP_j$.

Figure 7:
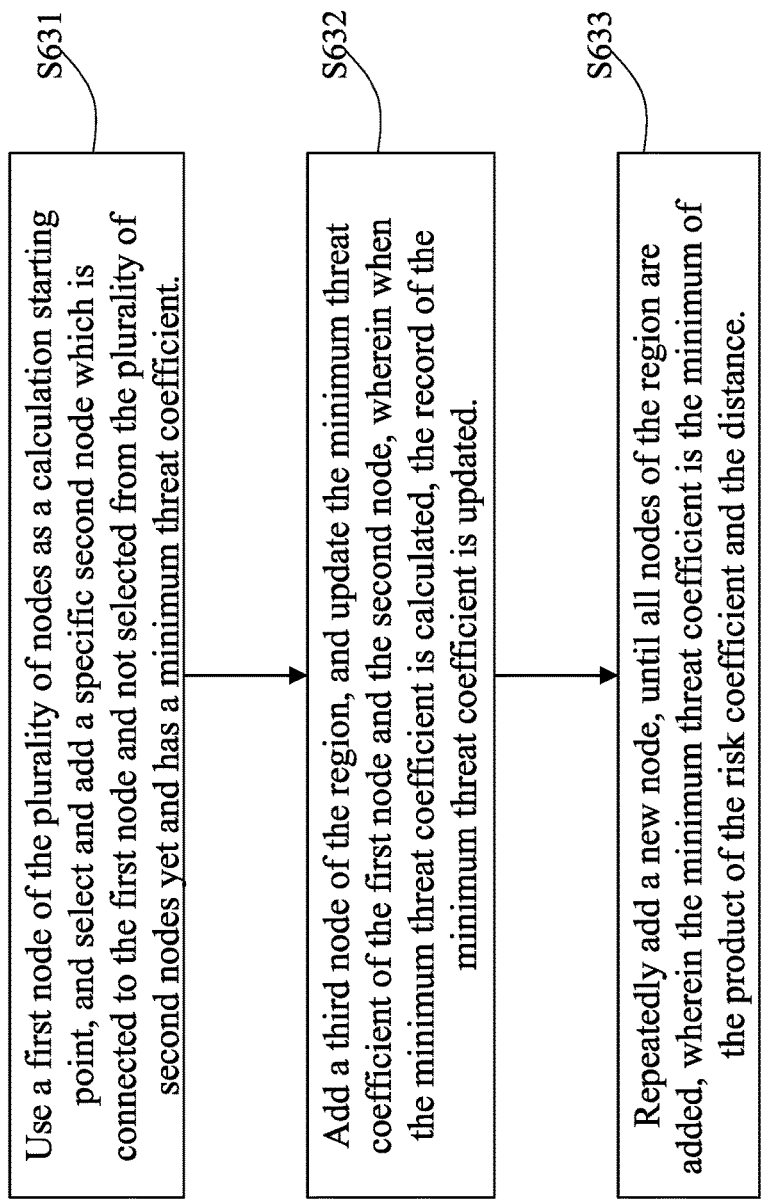
FIG. 7 is a flow chart of an operating example of Step S630 as depicted in FIG. 6.

With reference to FIG. 7 for a flow chart of the operation showing the details of the step S630 of FIG. 6, the operation includes but not limited to the following steps (it is noteworthy that the method may be carried out without following the sequence of the steps as shown in FIG. 7 to achieve the substantially same result):

Step S631: Use a first node of the plurality of nodes as a calculation starting point, and select and add a specific second node which is connected to the first node and not selected from the plurality of second nodes yet and has a minimum threat coefficient.

Step S632: Add a third node of the region, and update the minimum threat coefficient of the first node and the second node, wherein when the minimum threat coefficient is calculated, the record of the minimum threat coefficient is updated. In other words, after the third node is added, it is necessary to update the threat coefficient of "the third node to the reach the first node" or "the third node to reach the second node". If a smaller numerical value of the threat coefficient is calculated and obtained, the numerical value of the threat coefficient of the path passing through the third node is updated and replaced. Regardless of the path of the third node reaching the first node or the path reaching the second node, the numerical value of the threat coefficient has the smallest value. The path of "the third node reaching the first node" may be one passing the second node or not passing the second node.

Step S633: Repeatedly add a new node, until all nodes of the region are added, wherein the minimum threat coefficient is the minimum of the product of the risk coefficient and the distance.

With reference to the steps as shown in FIG. 7, the components as shown in FIG. 1, and the operation of the components in accordance with a preferred embodiment as shown in FIGS. 2 and 3, the description of all of these will not be repeated for simplicity.

In summation of the description above, the present invention provides an intelligent disaster prevention and escape method and an intelligent disaster prevention and escape system capable of producing the safest path plan according to a risk coefficient and a distance between adjacent nodes to provide safe, reliable and immediate escape instructions, so as to guide people to escape and evaporate for a disaster site. Compared with the conventional building survival systems, the present invention has the following advantages and effects. The present invention guarantees the safest path for different positions of a floor of a building while taking the emergency situations of a disaster into consideration, or selects the safest and best path for the escape and evacuation according to the emergency situations of the disaster and maximizes the possibility of the escape and the safety of the evacuation. Since the emergency situation may change with time, and channels may be changed accordingly, the present invention can immediately and dynamically select the best and safest path according to the situation of the disaster at different time. In addition, the present invention meets the requirements of the safety, intelligence, reliability, and timeliness for the escape and evacuation of an intelligent building.

While the invention has been described by means of specific embodiments, numerous modifications and variations could be made thereto by those skilled in the art without departing from the scope and spirit of the invention set forth in the claims.

What is claimed is:

1. An intelligent disaster prevention and escape method, comprising the steps of:
    sensing surrounding environment information of a plurality of nodes of a region of a building to generate a plurality of sensing signals of the plurality of nodes respectively;
    calculating a risk coefficient of each node according to the plurality of sensing signals;
    calculating a threat coefficient for a plurality of paths according to the plurality of risk coefficients and a distances between the plurality of adjacent nodes, and further executing an escape path planning algorithm to produce a safest path plan; and
    producing a plurality of escape instructions for the plurality of nodes respectively according to the safest path plan;
    wherein the escape path planning algorithm executes the steps of:
    setting a first node of the plurality of nodes as a calculation starting point, and then selecting and adding an unselected second node with the minimum threat coefficient from in which the unselected second node is chosen from a plurality of adjacent nodes;
    adding a third node of the region, and updating the threat coefficient from the third node to the first node or to the second node, and updating record of the minimum threat coefficient of the path with the third node when the minimum threat coefficient is calculated; and repeatedly adding a new node and calculating a minimum threat coefficient from the new node to any precursor node until all nodes of the region have been selected and added.

2. The intelligent disaster prevention and escape method of claim 1, wherein the escape path planning algorithm is provided for setting each exit node of the plurality of nodes as the calculation starting point to form the safest path plan, wherein an escape direction is the direction from one node toward the precursor node with the minimum threat coefficient.

3. The intelligent disaster prevention and escape method of claim 1, wherein the threat coefficient of the plurality of paths is calculated according to the risk coefficient and the distance between the adjacent nodes to perform the escape path planning algorithm and the safest path plan, further comprises the step of adding an exit node of a second region to the region for calculating the safest path plan.

4. An intelligent disaster prevention and escape system, comprising:
   a plurality of sensors installed to the nodes of a region in a building, for sensing surrounding environment information of the plurality of nodes to produce the plurality of sensing signals of plurality of nodes respectively;
   a plurality of escape direction instructing devices, installed at the plurality of nodes of the region in the building according to a safest path plan to generate a plurality of escape instructions of the plurality of nodes respectively; and
   a processing unit, coupled to the plurality of sensors and the plurality of escape direction instructing devices, for calculating a plurality of risk coefficients of the plurality of nodes according to the plurality of sensing signals; and calculating a threat coefficient of the plurality of paths according to the plurality of risk coefficients and a distances between the plurality of adjacent nodes for further executing an escape path planning algorithm and producing the safest path plan;
   wherein the escape path planning algorithm executes the steps of:
   setting a first node of the plurality of nodes as a calculation starting point, and then selecting and adding an unselected second node with the minimum threat coefficient from in which the unselected second node is chosen from a plurality of adjacent nodes;
   adding a third node of the region, and updating the threat coefficient from the third node to the first node or to the second node, and updating record of the minimum threat coefficient of the path with the third node when the minimum threat coefficient is calculated through the processing unit; and
   repeatedly adding a new node and calculating a minimum threat coefficient from the new node to any precursor node until all nodes of the region have been selected and added.

5. The intelligent disaster prevention and escape system of claim 4, wherein the escape path planning algorithm is provided for sequentially setting each exit node of the plurality of nodes as the calculation starting point to form the safest path plan, wherein an escape direction is the direction from one node toward the precursor node with the minimum threat coefficient.

6. The intelligent disaster prevention and escape system of claim 4, wherein the processing unit is provided for adding an exit node of a second region to the region for calculating the safest path plan.

* * * * *